Dec. 13, 1960 D. HODKIN 2,964,330
SUSPENSION MEANS FOR MOTOR VEHICLES
Filed Nov. 26, 1957 4 Sheets-Sheet 1

DAVID HODKIN
INVENTOR
by Irwin S. Thompson
ATTORNEY

Dec. 13, 1960     D. HODKIN     2,964,330
SUSPENSION MEANS FOR MOTOR VEHICLES
Filed Nov. 26, 1957     4 Sheets-Sheet 2

DAVID HODKIN
INVENTOR
by *Irwin S. Thompson*
ATTORNEY

United States Patent Office 2,964,330
Patented Dec. 13, 1960

2,964,330
SUSPENSION MEANS FOR MOTOR VEHICLES

David Hodkin, Dunstable, England, assignor to Engineering Research and Application Limited, a British company Filed Nov. 26, 1957, Ser. No. 699,059

Claims priority, application Great Britain Nov. 30, 1956

5 Claims. (Cl. 280—96.2)

This invention relates to suspension and steering means for the front wheels of motor vehicles.

The main object of the invention is to provide an improved suspension means which will transmit vertical loading on the wheels to a rigid part of the vehicle chassis and/or body. A further object is to provide suspension means which will minimize the effect of chassis distortion on the tracking of the wheels.

According to the present invention I provide suspension and steering means for the front wheel of a motor vehicle wherein a wheel stub shaft is carried by a pillar (or king post) upstanding therefrom which is connected at its lower end to the vehicle frame (chassis or part fixed to the chassis) by a pivoted link disposed transversely of the vehicle, and which is connected at or near its upper end to the frame by a pivoted link disposed approximately longitudinally of the vehicle, and a steering member is connected to one end of the pillar and is connected to a track rod that is disposed substantially parallel to the adjacent suspension link. If the steering member is connected to the lower end of the pillar, the track rod may be a one-part track rod which constitutes a further advantage. By thus arranging the steering member at the extreme end of the pillar instead of between its ends, it provides a track rod and link which are substantially level and parallel and are therefore arranged geometrically well suited to the fact that the two links are transverse to each other, and makes possible the use of a one-part track rod, and provides more available space at the front part of the vehicle.

By "one-part" track rod we include a track rod built up from separate elements if these are rigidly fixed together, but we exclude two separate rods which have independent movements.

If desired the steering member may be an integral part of the axle pillar formed at the lower end thereof below the stub shaft.

The term "approximately parallel" is intended to allow for a few degrees out of parallelism which can be accommodated by universal joints, rubber blocks, or the like.

A constructional form of the invention will now be described by way of example, with reference to the accompanying diagrammatic drawings wherein.

Figure 1:
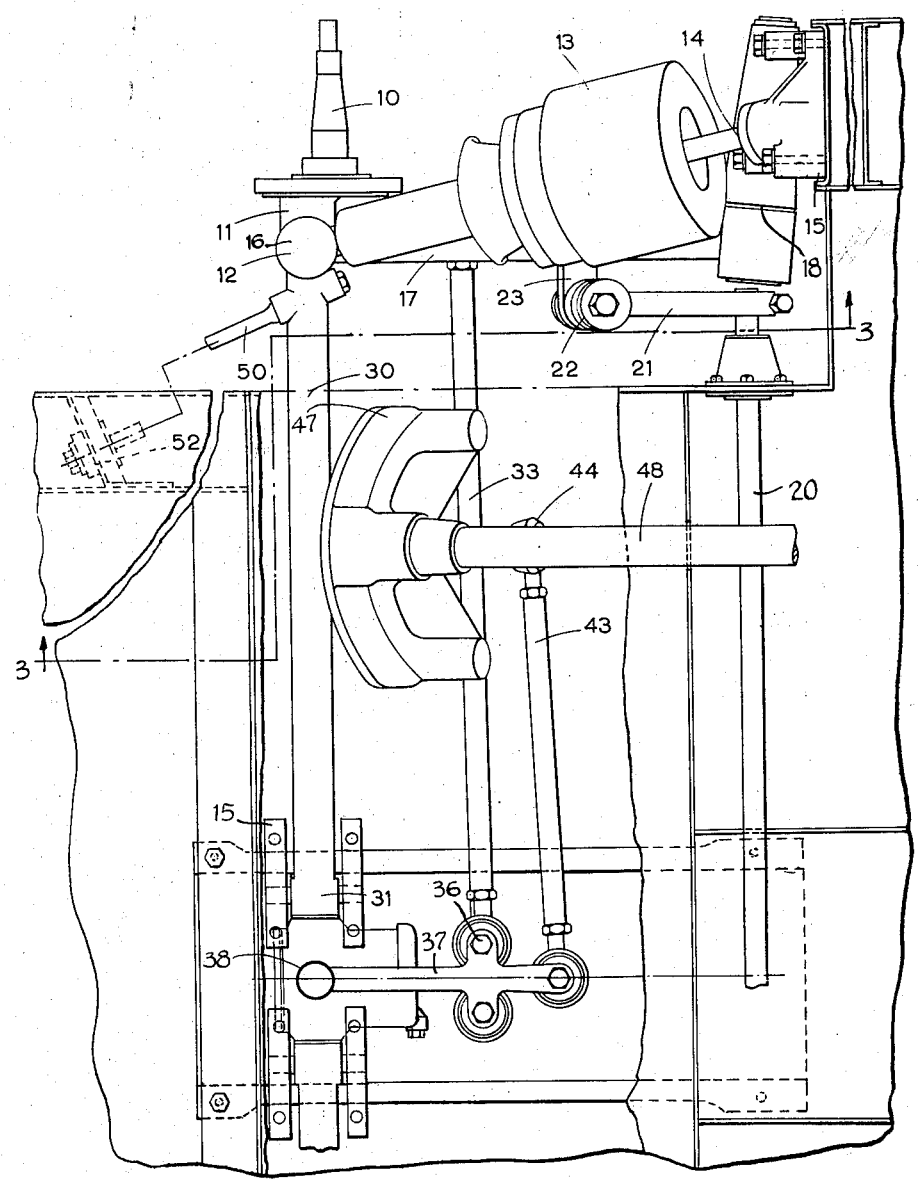
Figure 1 is a plan view showing mainly the lower suspension links and steering means of a suspension and steering system made in accordance with the invention.
Figure 2:
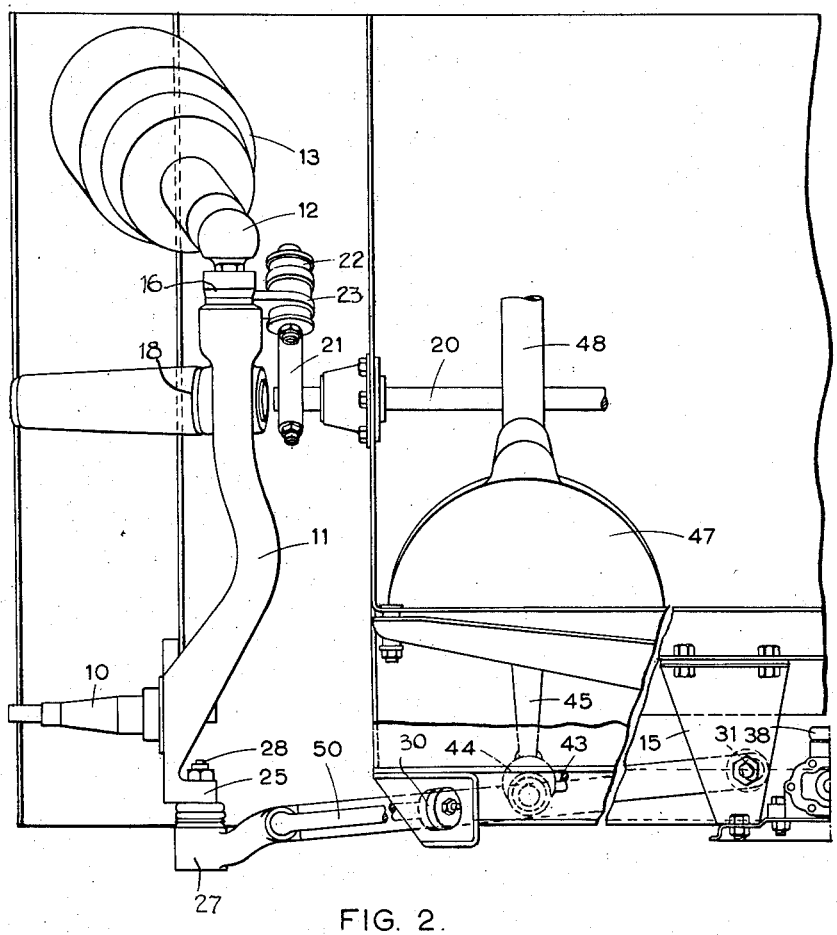
Figure 2 is a front elevation of part of such system.
Figure 3:
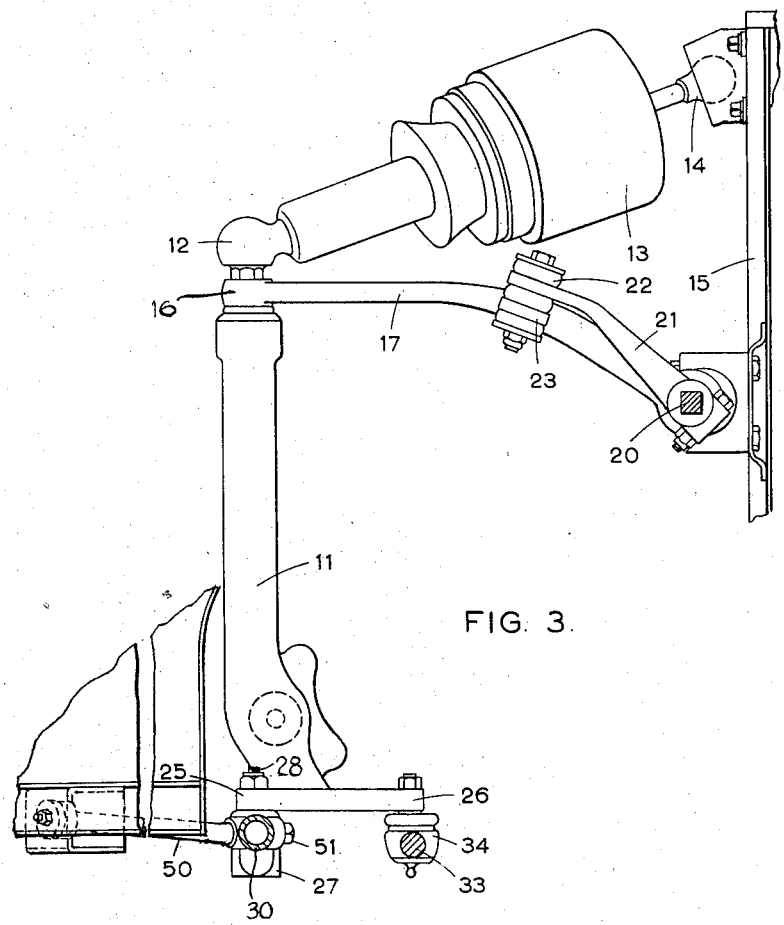
Figure 3 is a side view taken along section line 3—3 of Figure 1.
Figure 4:
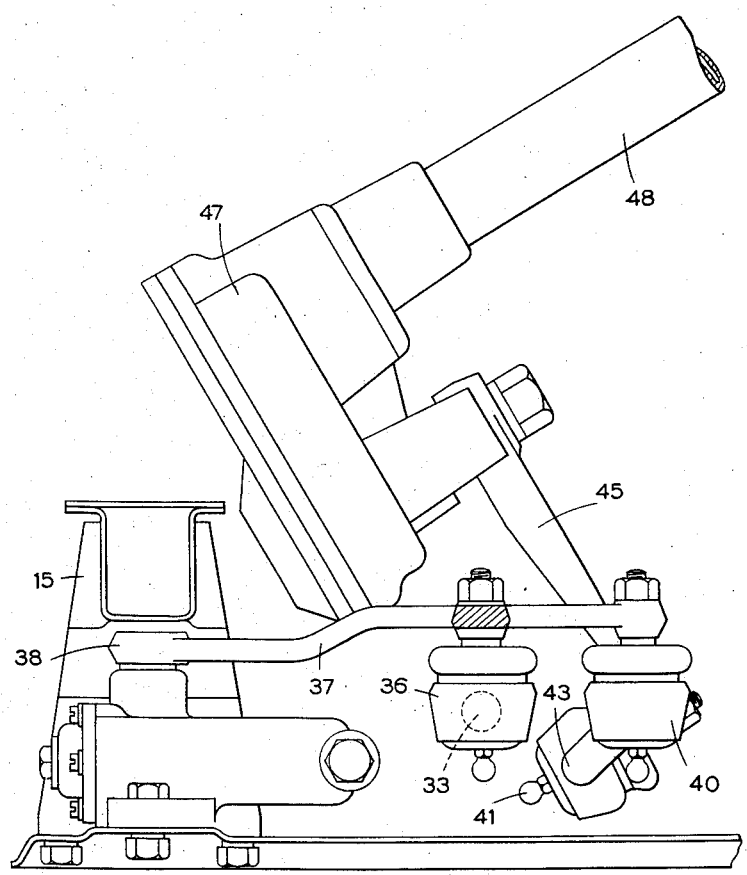
Figure 4 is a side view of the steering means.

Each front wheel stub shaft 10 is carried by a pillar or king post 11 that extends upwardly above the wheel and extends also to some distance downwardly.

The extreme upper end of the pillar 11 is connected at 12 to a bellows device 13 which is connected to the vehicle frame 15 at 14 and constitutes the spring means of the suspension. Adjacent the upper end of the pillar 11 is a connection at 16 to a suspension link 17 that extends substantially longitudinally of the vehicle and the rear end of which is pivoted at 18 on a horizontal axis to the frame of the vehicle. Adjacent the rear ends of the links 17 is a transverse torsion bar 20, the ends of which carry forwardly projecting arms 21 attached by rubber joints 22 to a connecting piece 23 which is connected to the suspension links 17.

The extreme lower end of the pillar has projections 25, 26 located in the same horizontal plane. The projection 25 is pivoted by ball joint 27 and bolt 28 to the outer end of a lower suspension link 30, the inner end of which is pivoted on the frame 15 on a horizontal axis at 31 disposed longitudinally of the vehicle.

The projection 26 serves as a steering member and this is pivoted to the outer end of a one part steering rod 33 by a ball joint 34. The inner end of the rod 33 is connected by a ball joint 36 to an idle lever 37, the front end of which is pivoted on a vertical axis at 38 on the frame. The rear end of the idle lever is connected by ball joint 40, rod 43, and joint 44 to a steering arm 45 driving by gearing 47 from a steering column 48.

It will be seen that the link 30 and track rod 33 are substantially parallel to each other with their front ends adjacent each other and their rear ends also fairly close together whereby they geometrically share substantially the same movements suited to the upper link which swings in a fore and aft plane. The link 30 and rod 33 are also both in a very low position and since the upper links do not extend transversely of the vehicle the whole of the central space between the wheels is free and available for other parts.

Lateral wheel loads do not affect the steering because of the parallelogram construction. Vertical wheel loads are transmitted to rigid side parts of the frame thereby leaving the central forward part of the chassis above the axis of the wheels free from load carrying or suspension means. The lateral wheel loads are transmitted to a common central position of the chassis, whereby chassis vibration or deformation is not transmitted to the steering.

A drag link 50 is connected at 51 to the lower suspension link near the outer end thereof. The drag link 50 extends across the vehicle at an angle of about 25 degrees to the longitudinal and is pivoted at its other end 52 to the frame. Vertical movements of the wheel occur about the pivots 31, 52.

I claim:

1. Suspension and steering means for the front wheel of a motor vehicle comprising a wheel stub shaft, a pillar carrying said stub shaft, a transverse suspension link located approximately at right angles to the longitudinal centre line of the vehicle and having its outer end pivoted to the lower end of said pillar and pivoted on a horizontal axis disposed longitudinally of the frame of the vehicle, a longitudinal suspension link disposed approximately parallel to the longitudinal axis of the vehicle, said longitudinal link being pivotally connected at its forward end to the upper end of the pillar and mounted at its rear end on a horizontal transverse axis on the vehicle frame, a projection fixed on one end of the pillar and projecting horizontally therefrom, a steering track rod located approximately parallel to the transverse suspension link and pivoted at its outer end to said projection and pivoted at its inner end to the vehicle steering means, and resilient means connected to said pillar and to a fixed part of the motor vehicle frame whereby the vehicle frame is resiliently secured to said pillar.

2. Suspension and steering means as claimed in claim 1, wherein the steering projection is formed integrally with the pillar at the lower end thereof below the stub shaft.

3. Suspension and steering means for the front wheel of a motor vehicle comprising a wheel stub shaft, a pillar carrying said stub shaft, a transverse suspension link located approximately at right angles to the longitudinal centre line of the vehicle and having its outer end pivoted on a vertical axis to the lower end of the pillar and pivoted on a horizontal longitudinally disposed axis to the frame of the vehicle, a longitudinal suspension link disposed approximately parallel to the longitudinal centre line of the vehicle, said longitudinal link being connected at its forward end to the upper end of the pillar, a torsion rod disposed transversely of the vehicle, the longitudinal link being connected between its ends to said torsion rod, a steering projection fixed on the lower end of the pillar and extending horizontally therefrom, a steering track rod disposed substantially parallel to the transverse suspension link, a universal joint connecting the outer end of the track rod to the projecting end of said projection, an idle lever located centrally of the vehicle and mounted on a vertical pivot on the vehicle, a second universal joint connecting the inner end of the track rod to the vehicle steering means, a shock absorber connected at one end to the upper end of the pillar and at the other end to the vehicle frame, and a drag link inclined to both suspension links and connected at its rear end to the transverse suspension link near the pillar and pivotally connected at its forward end to the vehicle frame.

4. Suspension and steering means as claimed in claim 3, having an arm on the torsion bar that extends forwardly and approximately parallel to the upper suspension link and the forward end of said arm is connected to the upper suspension link.

5. Suspension means for a front wheel of a motor vehicle comprising a wheel stub shaft, a pillar supporting said stub shaft, a transverse suspension link located approximately at right angles to the longitudinal centre line of the vehicle, and having its outer end pivoted on a vertical axis to the lower end of the pillar and having its inner end pivoted on a horizontal longitudinal disposed axis to the frame of the vehicle about centrally of the vehicle, a longitudinal suspension link disposed approximately parallel to the longitudinal centre line of the vehicle, said longitudinal link being connected at its forward end to the upper end of the pillar, a torsion rod mounted transversely of the vehicle, means for connecting the rearward portion of the longitudinal link to the torsion rod, means connecting the rear end of the longitudinal link on a horizontal pivotal axis to the vehicle frame, and a drag link inclined to both the suspension links and connected at its rear end pivotally with the transverse suspension link and connected at its forward end pivotally to the vehicle frame.

References Cited in the file of this patent
UNITED STATES PATENTS

| | | |
|---|---|---|
| 2,073,032 | Stimson | Mar. 9, 1937 |
| 2,290,923 | Wahlberg | July 28, 1942 |
| 2,334,702 | Newton et al. | Nov. 23, 1943 |
| 2,409,501 | Krotz | Oct. 15, 1946 |
| 2,652,263 | Varum | Sept. 15, 1953 |
| 2,771,302 | Booth et al. | Nov. 20, 1956 |